United States Patent [19]

Matsumoto

[11] Patent Number: 5,420,694
[45] Date of Patent: May 30, 1995

[54] IMAGE PROCESSING SYSTEM

[75] Inventor: Fuminari Matsumoto, Kanagawa, Japan

[73] Assignee: Fuji Xerox Co., Ltd., Tokyo, Japan

[21] Appl. No.: 3,947

[22] Filed: Jan. 19, 1993

Related U.S. Application Data

[63] Continuation of Ser. No. 596,065, Oct. 10, 1990, abandoned.

[51] Int. Cl.6 .............................................. H04N 1/40
[52] U.S. Cl. ..................................... 358/462; 358/448
[58] Field of Search ............... 358/448, 456, 462, 467, 358/500

[56] References Cited

U.S. PATENT DOCUMENTS

| | | | |
|---|---|---|---|
| 4,930,007 | 5/1990 | Sugiura et al. | 358/467 |
| 4,949,188 | 8/1990 | Sato | 358/452 |
| 4,953,012 | 8/1990 | Abe | 358/462 |
| 4,953,013 | 8/1990 | Tsuji et al. | 358/462 |
| 4,996,603 | 2/1991 | Kanemitsu et al. | 358/462 |
| 5,016,118 | 5/1991 | Nannichi | 358/462 |
| 5,075,788 | 12/1991 | Funada | 358/462 |
| 5,189,523 | 2/1993 | Sugiura et al. | 358/464 |

*Primary Examiner*—Scott A. Rogers
*Assistant Examiner*—Thomas L. Stoll
*Attorney, Agent, or Firm*—Finnegan, Henderson, Farabow, Garrett & Dunner

[57] ABSTRACT

An image processing system, comprising an image reading section for reading an original image and sequentially generating image data corresponding to the original image, and for discriminately recognizing a plurality of original image types and generating recognition signals corresponding to one of the plurality of original image types, the one being the image type of the original image read by the image reading means, image processing section for determining a data structure for the image data according to the recognition signals, and for storing and retrieving the image data according to the sequence in which the image data was generated and, image recording section for producing a plurality of copy image types corresponding to the plurality of copy image types.

4 Claims, 7 Drawing Sheets

FIG. 6(A)

| | | | | | | | | | | | | | | | | |
|---|---|---|---|---|---|---|---|---|---|---|---|---|---|---|---|---|
| 0 $G_2$ | 0 $G_1$ | 1 $G_2$ | 1 $G_1$ | 2 $G_2$ | 2 $G_1$ | 3 $G_2$ | 3 $G_1$ | 4 $G_2$ | 4 $G_1$ | 5 $G_2$ | 5 $G_1$ | 6 $G_2$ | 6 $G_1$ | 7 $G_2$ | 7 $G_1$ | ⎫ |
| 8 $G_2$ | 8 $G_1$ | | | | | | | | | | | | | | | ⎬ 0TH LINE |
| | | | | | | | | | | | | 4670 $G_2$ | 4670 $G_1$ | 4671 $G_2$ | 4671 $G_1$ | ⎭ |
| 0 $G_2$ | 0 $G_1$ | 1 $G_2$ | 1 $G_1$ | | | | | | | | | | | | | ⎫ |
| | | | | | | | | | | | | | | | | ⎬ 1ST LINE |
| | | | | | | | | | | | | 4670 $G_2$ | 4670 $G_1$ | 4671 $G_2$ | 4671 $G_1$ | ⎭ |
| | | | | | | | | | | | | | | | | |
| 0 $G_2$ | 0 $G_1$ | 1 $G_2$ | 1 $G_1$ | 2 $G_2$ | 2 $G_1$ | | | | | | | | | | | ⎫ |
| | | | | | | | | | | | | | | | | ⎬ 3301ST LINE |
| | | | | | | | | | | | | 4670 $G_2$ | 4670 $G_1$ | 4671 $G_2$ | 4671 $G_1$ | ⎭ |

FIG. 6(B)

| 0 G₂ | 0 G₁ | 0 CF | 1 G₂ | 1 G₁ | 1 CF | 2 G₂ | 2 G₁ | 2 CF | 3 G₂ | 3 G₁ | 3 CF | 4 G₂ | 4 G₁ | 4 CF | 5 G₂ |
|---|---|---|---|---|---|---|---|---|---|---|---|---|---|---|---|
| 5 G₁ | 5 CF | 6 G₂ | 6 G₁ | 6 CF | | | | | | | | | | | |

} 0TH LINE

4670 G₂ | 4670 G₁ | 4670 CF | 4671 G₂ | 4671 G₁ | 4671 CF

| 0 G₂ | 0 G₁ | 0 CF | 1 G₂ | 1 G₁ | 1 CF | 2 G₂ | 2 G₁ | 2 CF | 3 G₂ | 3 G₁ | 3 CF | 4 G₂ | 4 G₁ | 4 CF | 5 G₂ |
| 5 G₁ | 5 CF | 6 G₂ | 6 G₁ | 6 CF | | | | | | | | | | | |

} 3301ST LINE

| 0 G₃ | 0 G₂ | 0 G₁ | 1 G₃ | 1 G₂ | 1 G₁ | 2 G₃ | 2 G₂ | 2 G₁ | 3 G₃ | 3 G₂ | 3 G₁ | 4 G₃ | 4 G₂ | 4 G₁ | 5 G₃ |
|---|---|---|---|---|---|---|---|---|---|---|---|---|---|---|---|
| 5 G₂ | 5 G₁ | | | | | | | | | | | | | | |
| | | | | | | | | | 4670 G₃ | 4670 G₂ | 4670 G₁ | 4671 G₃ | 4671 G₂ | 4671 G₁ | |

0TH LINE

| 0 | 0 | 0 | 1 | 1 | 1 | 2 | 2 | 2 | 3 | 3 | 3 | 4 | 4 | 4 | 5 |
|---|---|---|---|---|---|---|---|---|---|---|---|---|---|---|---|
| 5 | 5 | 5 | 5 | | | | | | | | | | | | |
| | | | | | | | | | 4670 G₃ | 4670 G₂ | 4670 G₁ | 4671 G₃ | 4671 G₂ | 4671 G₁ | |

3301ST LINE

IMAGE PROCESSING SYSTEM

This application is a continuation of application Ser. No. 07/596,065, filed Oct. 10, 1990, now abandoned.

BACKGROUND OF THE INVENTION

1. Field of the Invention

The present invention relates to an image processing system which reads an image on an original document, processes the image data as read, and outputs the image in the form of a hard copy.

2. Discussion of the Prior Art

An image processing system which electronically copies a plurality of original documents in a predetermined order of pages, and outputs the copies is known in the art. This copy process will be referred to as a recirculating document handling (RDH) function. A schematic illustration of a conventional image processing system using this copy process is shown in FIG. 7.

In FIG. 7, image data output from an image reading section 51 is first stored in a page memory 53 of a storage unit 52. Generally, the storage unit 52 has a large memory storage capacity in order to store image data representing a number of document pages. Accordingly, a magnetic memory device, such as a hard disk 54, is used in the storage unit 52. A typical access time for the hard disk 54 is approximately 1M byte/sec.

Usually, the hard disk access time is not equal to the transfer rate of input image data provided by the image read section. To compensate for the time difference between these two data transfer rates, the page memory 53 is provided. Image data, temporarily stored in the page memory 53, is sequentially transferred to and stored on the hard disk 54. After image data of a preset number of documents has been stored on the hard disk 54, the image data is then read from the hard disk, and stored again in the page memory 53. After a preset amount of image data has been stored in the page memory 53, the image data is synchronously read from the page memory 53 at a data processing rate defined by the image recording section 55, and transferred to the image recording section 55. Finally, the image record section 55 outputs hard copies of the original documents.

According to this process, the image processing system reads image data corresponding to a number of original document pages, stores the image data on the hard disk 54, and sequentially reads the image data from the hard disk 54 in the page order of the original documents. Consequently, the image processing system can copy a desired number of document pages in a desired order. In other words, the image processing system is capable of electrically performing the RDH function. This function simplifies the work required to produce finished document copies once the ordered pages have been output.

There are several types of document images, such as monochromatic character, monochromatic photograph which requires expression in a multiple of gradations, and color. The RDH function is typically applied to original documents containing a variety of different image types. However, in the image processing system shown in FIG. 7, the read function of the image data and the structure used to store the read image data are fixed irrespective of the image type appearing on individual document pages. The copy mode or image data read structure can be set for the image processing system only on a job or batch basis. Accordingly, the image processing system will operate as set forth in the following examples.

If an original document consists of a single sheet of color text and multiple sheets of monochromatic character text, a color copy mode must nonetheless be selected. If a sheet requiring halftone expression, such as photograph, is contained in an original document, a copy mode capable of halftone expression must be selected. As a result of selecting these various modes, the time and resources required to process each page of the original document is significantly increased regardless of the actual image type on an individual page being processed. The image processing system is, thus, inefficiently used. Specifically, in the first example where the color copy mode was selected, the image processing system will execute color processing for each page of the document. However, no color processing is required for the multiple pages containing monochromatic character text and the additional time required for color processing these pages will be wasted. In the second example where the halftone copy mode was selected, the halftone expression is unnecessary for the pages of monochromatic character text, but will nevertheless be executed, and time and resources, such as toner, will be wasted.

SUMMARY OF THE INVENTION

The present invention has been made in view of the above circumstances and has as an object an image processing system which recognizes the image type on each page of an original document, and which automatically selects a copy mode on the basis of this recognition.

Another object of the present invention is an image processing system will make efficient use of system resources and will reduce the time required to process many original documents.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve these objects and in accordance with the purpose of the invention, as embodied and broadly described herein, the image processing system, of this invention comprises image reading means for reading an original image and sequentially generating image data corresponding to the original image, and for discriminately recognizing a plurality of original image types and generating recognition signals corresponding to a one of the plurality of original image types, the one being the image type of the original image read by the image reading means, image processing means for determining a data structure for the image data according to the recognition signals, and for storing and retrieving the image data according to the sequence the image data was generated and, image recording means for producing a plurality of copy image types corresponding to the plurality of copy image types.

BRIEF DESCRIPTION OF THE DRAWINGS

The accompanying drawings, which are incorporated in and constitute a part of this specification illustrate embodiments of the present invention and, together with the description, serve to explain the objects, advantages and principles of the invention. In the drawings.

FIGS. 6(A), 6(B) and 6(C) show how image data is stored when a serial pack storage system is used.

DETAILED DESCRIPTION OF THE PREFERRED EMBODIMENTS

A preferred embodiment of an image processing system according to the present invention will be described with reference to the accompanying drawings.

Figure 1:
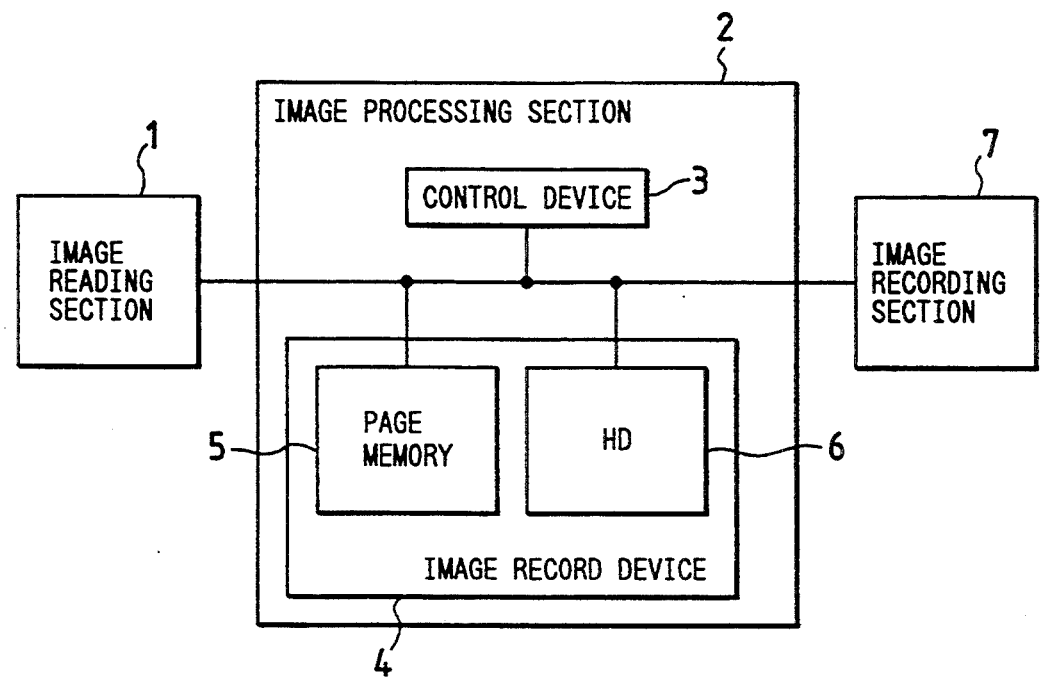
FIG. 1 is a block diagram showing an image processing system according to the present invention.
Figure 7:
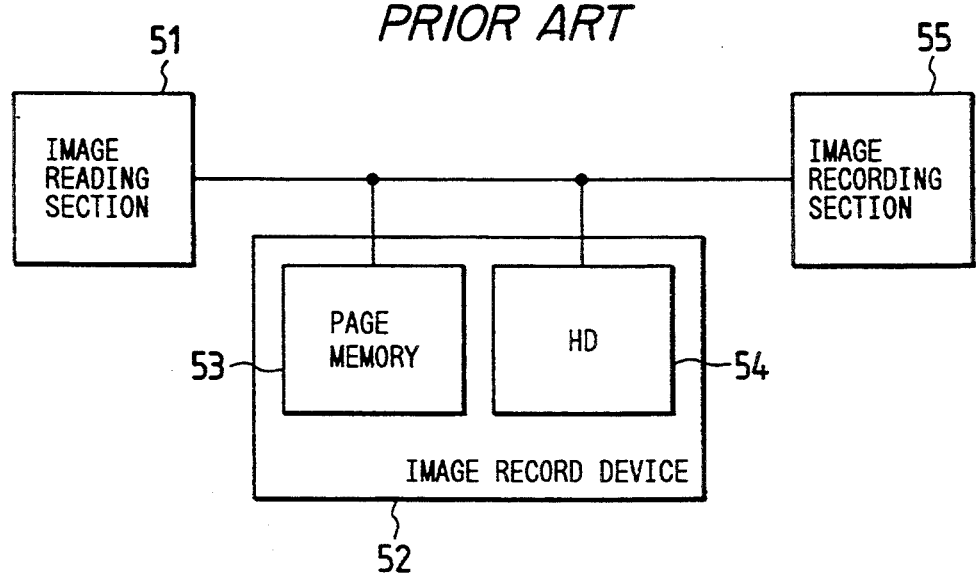
FIG. 7 is a block diagram showing a conventional image processing system.

FIG. 1 is a block diagram showing an image processing system according to the present invention. This system includes an image reading section 1, an image processing section 2, and an image recording section 7. The image reading section is capable of discriminately recognizing colors.

The image processing section 2 recognizes an image on a document page as read by the image reading section 1, and determines the structure of image data on the basis of this recognition. More specifically, the image processing section recognizes the image type of the document, (e.g., monochromatic character, monochromatic halftone or color), and selects a copy mode on the basis of this recognition. For example, if a document page containing monochromatic characters was recognized, the image processing system would determine to use a data structure of 2 bits per picture element (pixel). If a document page containing monochromatic halftone were recognized, a data structure of 3 bits for one pixel would be used. If a color document page were recognized, the image processing system would employ a data structure of 3 bits, 2 bits per pixel containing density information and 1 bit containing a color flag indicative of the pixel's color.

According to this arrangement the structure of image data is properly selected for a variety of document image types. Furthermore, upon recognition of the image type the proper copy mode is selected for each document page. The problem of wasted time associated with the color processing of monochromatic document pages, and the problem of wasted resources associated with the halftone expression processing of monochromatic document pages are solved. Accordingly, the image processing system makes more efficient use of resources the processing speed of the job, as a whole, is increased.

Figure 2:
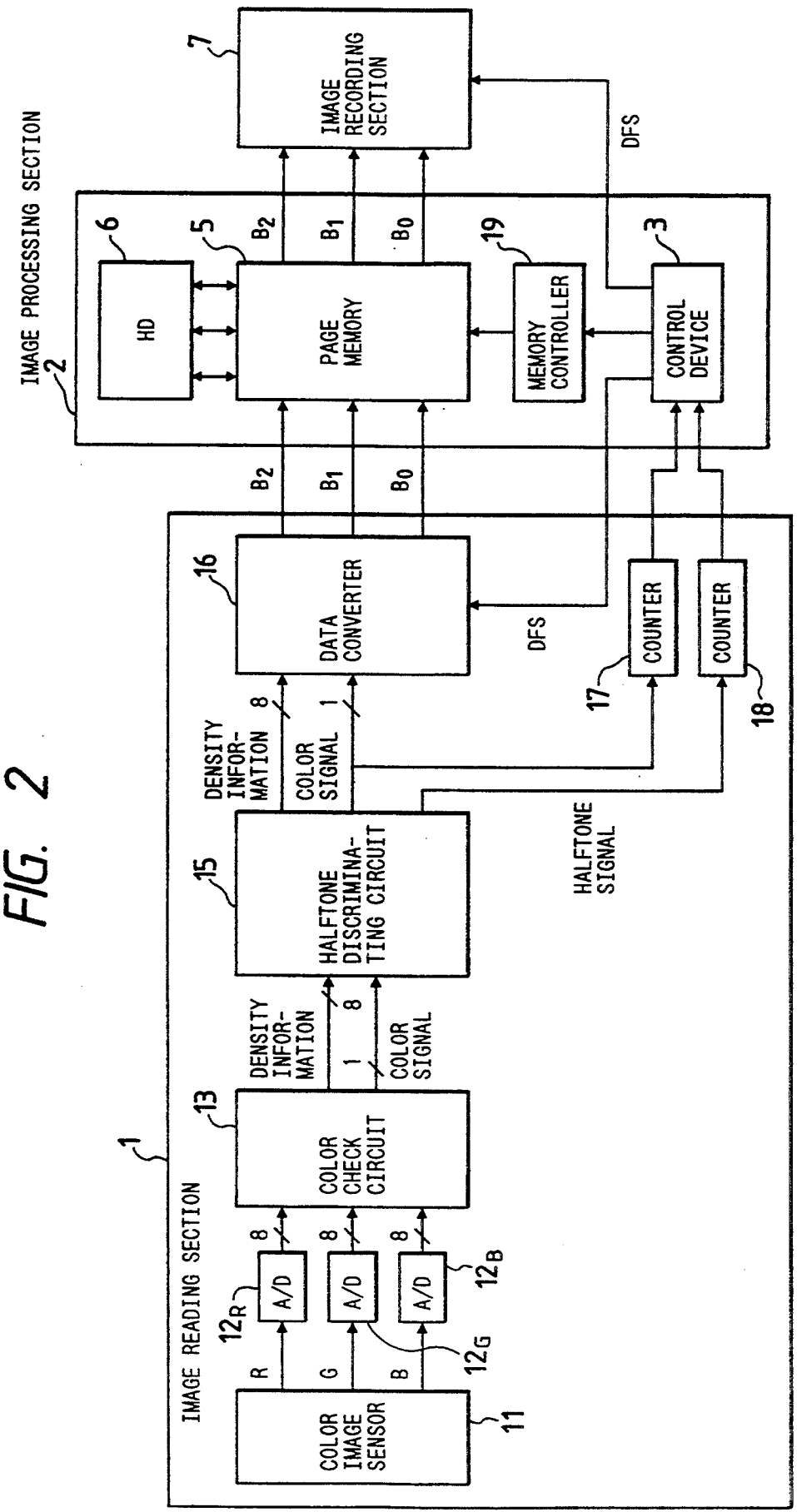
FIG. 2 is a block diagram showing an image reading section in an arrangement of an image processing system according to an embodiment of the present invention.

FIG. 2 is a block diagram showing an arrangement of an image processing system according to an embodiment of the present invention which more specifically illustrates the image reading section 1. In FIG. 2, reference numeral 1 designates an image reading section 1; 2 an image processing section; 3 a control device; 5 a page memory; 6 a hard disk; 7 an image recording section; 11 a color image sensor; 12R, 12G, and 12B A/D converters; 13 a color check circuit; 15 a halftone discriminating circuit; 16 a data converter; 17 and 18 counters; 19 a memory controller.

Figure 3:
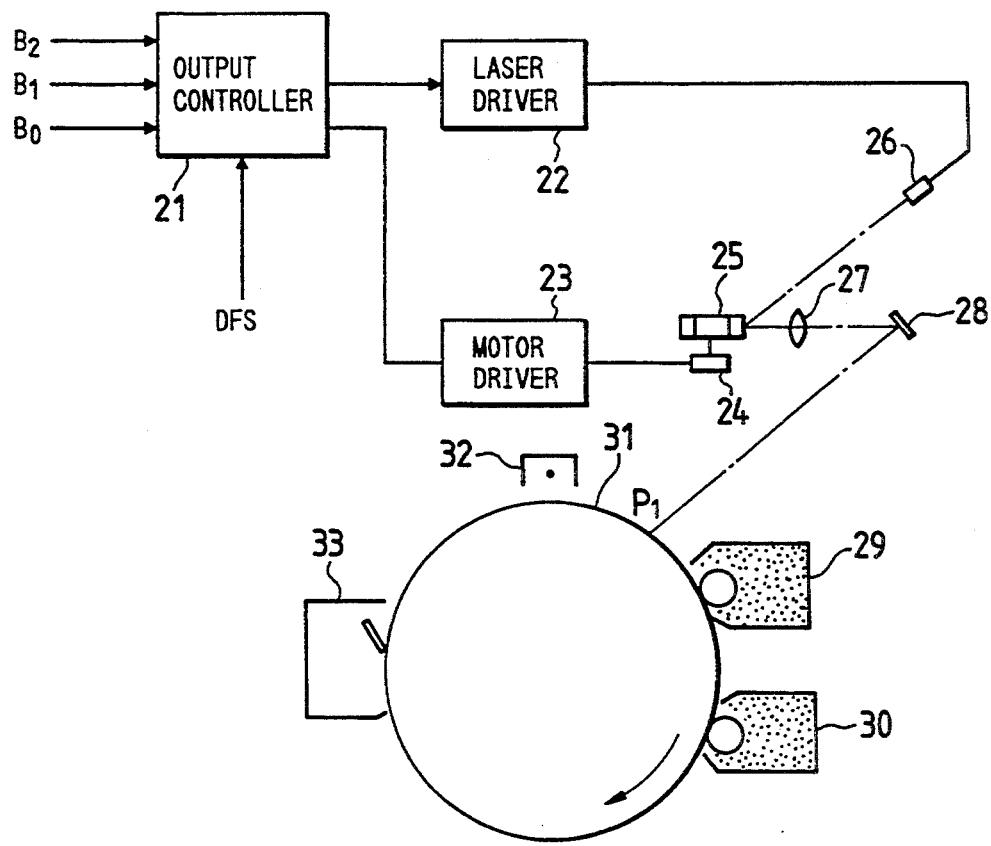
FIG. 3 illustrates in block and schematic form an image recording section of the image processing system shown in FIG. 2.

FIG. 3 shows in block and schematic form an image recording section 7 of the image processing system of FIG. 2.

In FIG. 3 reference numeral 21 designates an output controller; 22 a laser driver; 23 a motor driver; 24 a motor; 25 a polygonal mirror; 26 a laser; 27 a lens; 28 a reflecting mirror; 29 and 30 developing units; 32 a charger; and 33 a cleaner.

Operation of the image processing system as shown in FIGS. 2 and 3 will be described. The process of recognizing the image on an original document page prior to actually reading the entire original document will be described with reference to FIG. 2.

The document pages constituting one job or batch are placed in an automatic document feeder (not shown) in the image reading section 1. An operator selects the size of the copy paper, the number of desired copies and other output copy characteristics from a user interface (not shown), and pushes a start button (not shown). The control device 3 instructs the image reading section 1 to perform a prescan in order to recognize the image on the first document page. In response to the instruction, the image reading section 1 reads the image on the document page, and outputs analog data signals representative of density information of red (R), green (G), and blue (B) for each pixel. The three analog data signals are converted into digital data signals by respective A/D converters 12R, 12G, and 12B. The resulting digital signal contains a given number of bits, (e.g., 8-bits), which represent the density information.

The color check circuit 13 determines whether or not a density level for a given color exceeds a threshold value. If the density level is above the threshold, a color signal is set to "1." If the density level is below the threshold, the color signal is set to "0." The color signal and the density information signal are transferred to the halftone discriminating circuit 15.

When there is no command by the operater, the colors checked by the color check circuit 13 are the same as those of the developing units contained in the image recording section 7. As will be described later, the image recording section 7 is a plus-one color system in which two developing units are used, a black developing unit and a color developing unit. The control device 3 determines the color output from the color developing unit currently in use, and instructs the color check circuit 13 to check the document image for this color. For example, if the present color developing unit produces a red output copy, the color check circuit 13 determines whether or not the red is present in the original document page. The density information signal from the color check circuit 13 may comprise the largest density information signal selected from the density information signals corresponding to R, G, and B, or may comprise a single density information signal corresponding to a single selected color, such a R signal.

The halftone discriminating circuit 15 determines whether or not the image read by the image reading section 1 requires halftone expression, (e.g., photograph image). The halftone discriminating circuit 15 analyzes the frequency components of the density information signal, and determines if the pixels of the image on the original document page have halftones. If the answer is YES, the halftone signal is set to "1". If the answer is NO, the halftone signal is set to "0." The halftone discriminating circuit 15 then outputs the density information signal and the color signal as they were input.

The color signal and the halftone signal as outputted from the halftone discriminating circuit 15 are inputted into counters 17 and 18, respectively. The counter 17 counts the number of pixels whose corresponding color signals are "1's." The counter 18 counts the number of pixels whose corresponding halftone signals are "1's". The resulting counter signals are input into the control device 3.

If the value of the resulting counter signal for the color signal of a document page is above a threshold value, the control device 3 determines that document page to be a color page. If the value of the resulting counter signal for the halftone signal of a document page is above a threshold value, the control device 3 determines that the document page is a halftone page. Otherwise, the control device 3 determines that the document page is a monochromatic character page, determines the format of the monochromatic character image data, and sends the image data format to the data converter 16 as a data format signal (DFS). If a pixel's color signal is "1" and halftone signal is "1", the control device 3 determines that the document page is a color page and determines the image data format accordingly.

In this way, the control device 3 recognizes the image on a document page, and subsequently instructs the image reading section 1 to perform a main scan on the document page. The image data signals collected by the main scan are inputted into the data converter 16 after passing through the paths previously described. The corresponding color signals are also applied to the data converter 16.

Figure 5A:
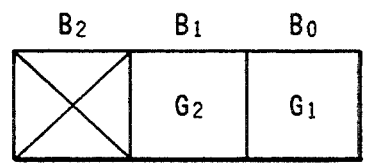
FIGS. 5(A), 5(B) and 5(C) show examples of image data formats as selected according to the contents of images on documents.
Figure 5B:
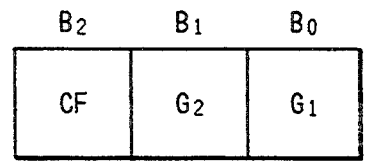
Figure 5C:
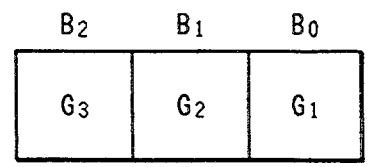

The data converter 16 generates image data of a maximum of 3 bits, for example, on the basis of the document format signal (DFS) by using the density information signal and the color signal. When the DFS indicates a monochromatic character image, the data converter 16 converts the 8-bit density information into a 2 bit structure, and outputs it as shown in FIG. 5(A). When the DFS indicates a color image, the data converter 16 converts the 8-bit density data into information 2 bit data, adds a color flag (CF) indicating whether or not the pixel is a color pixel, and generates a resulting 3 bit data structure as shown in FIG. 5(B). When the DFS indicates a halftone image, the data converter 16 converts the 8-bit density information data into a 3 bit data structure, and outputs it as shown in FIG. 5(C). In FIGS. 5(A), 5(B) and 5 (C), G1, G2, and G3 indicate density information data.

Image data thus generated is transferred to the page memory 5. The page memory 5 is preferably of the serial pack storage system in which bits of image data are serially stored in memory. Assuming a typical serial pack storage system and in the case of a document page containing monochromatic characters, the image data is stored in memory as shown in FIG. 6(A). In the case of a document page containing color, the image data is stored in memory as shown in FIG. 6(B). In the case of the document page containing halftone expressions, the image data is stored in memory as shown in FIG. 6(C).

In the image processing system shown in FIG. 2, a maximum of 3 bits are used to represent one pixel. If a plane memory is used for the page memory 5, three planes of memory are accordingly required. In the present invention, the number of bits per pixel differs with the different images on the document pages, as described above. Given the color and halftone document pages represented by 3 bits per one pixel, the page memory 5, when it consists of three plane memories, would be effectively utilized. However, in the case of the monochromatic character document, represented by 2 bits per pixel, the memory plane of the most significant bit would not be used. Such non-use would degrade the cost performance of the page memory. If a serial pack storage system is used for the page memory 5, as seen from FIGS. 6(A) to 6(C), the page memory can effectively be utilized at all times irrespective of the number of bits used to represent one pixel. FIGS. 6(A) to 6(C) each show memory maps for an image on a document which is made up of 3302 lines each line consisting of 4672 pixels.

The sequence of operations, as described above, is repeatedly applied to store the image of the first document page and all subsequent document pages in page memory 5. In this way, the images on document pages are stored in page memory 5 with the data structures based on the contents of the images.

Figure 4A:
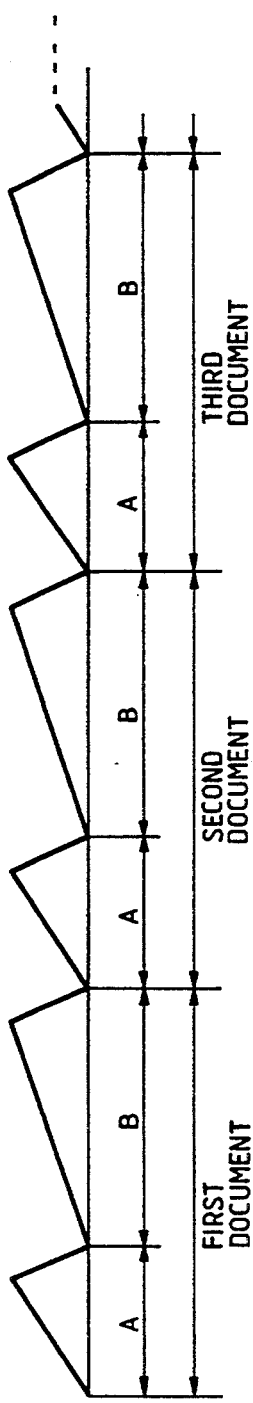
FIGS. 4(A) and 4(B) show profiles of a prescan and a main scan.
Figure 4B:
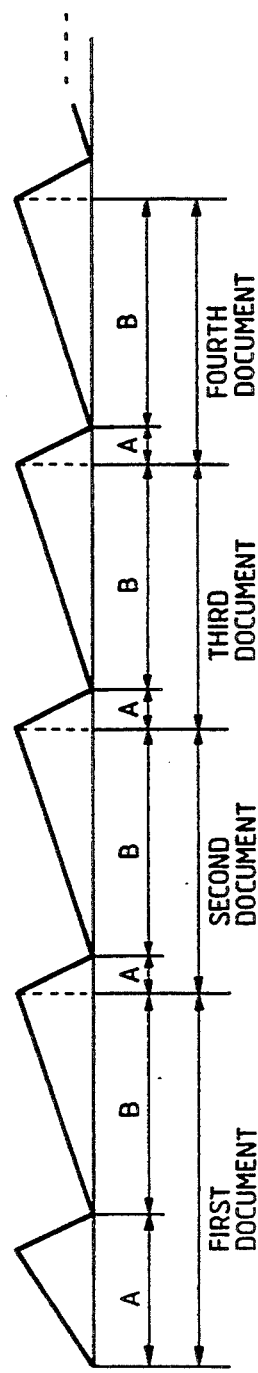

The prescan to recognize the contents of the document images and the main scan to store the image data may be performed in a profile as shown in FIG. 4(A) or 4(B). In the figures, "A" indicates the prescan and "B" the main scan. In the profile of FIG. 4(A), the first document page is prescanned at high speed, and is then main scanned at a normal read rate. This sequence is repeated for the second and subsequent document pages. In the profile of FIG. 4(B), the profile of the scans for the first document page is the same as that in the profile of FIG. 4(B). For the second and subsequent document pages, the prescan is performed during the return of the main scan for the previous document page.

The copy output process is as follows. The image data is read out of the page memory 5 and applied to the output controller 21 of the image recording section 7. A DFS is additionally supplied from control device 3 to the output controller 21. When the DFS indicates a monochromatic character page, the output controller 21 generates a signal capable of expressing four gray levels on the basis of the image data, and transfers it to the laser driver 22. A laser drive signal is supplied from the laser driver 22 to the laser 26 which in turn emits a laser beam. The laser beam is deflected by the polygonal mirror 25, and converges to a predetermined position P1 on a photoreceptor 31, through the lens 27 and the reflecting mirror 28, to form a latent electrostatic image of one line. Sync signals for the main scan and the vertical scan are supplied from the image read section 1 to the output controller 21 directly or through the control device 3. It is evident that the motor 24 and the photoreceptor 31 turn in synchronism with the sync signals.

The latent electrostatic image of one line is successively formed at the position P1 on the photoreceptor 31. The latent image is developed by the black developing unit 29, and transferred onto a copy paper (not shown), and fixed. Finally, the copy paper bearing the fixed image is discharged.

In case where the DFS indicates a document page requiring halftone expression, a similar sequence of operations is performed. In this case, however, the output controller 21 generates a signal capable of expressing eight gray levels on the basis of the image data, and transfers it to the laser driver 22.

In case where the DFS indicates a color document page, the output controller 21 first transfers a block color of the pixel whose color flag is "0," a latent image corresponding to the block color pixel is formed, on the photoreceptor 31. The latent image is developed by the monochromatic developing unit 29, and is transferred onto the copy paper in the process as mentioned above. Then the output controller 21 transfers a red color of the pixel whose color flag is "1," a latent image corresponding to the red color pixel, for example, is formed on the photoreceptor 31. The latent image is developed by a red developing unit 30 and is transferred onto the copy paper in similar process. Finally, the transferred image is fixed and discharged.

In the case where a plurality of output copies is selected, the control device 3 reads the image data of the documents in the designated order from the page memory 5 or the hard disk 6, and transfers the data to the image record section 7. The control device 3 also supplies a DFS for every document page to the output controller 21. In this way, a plurality of copies are output in the desired order.

An embodiment of the present invention has been described wherein the image on a document page is recognized before the document is read. A second embodiment will now be described wherein the image data is read out of page memory 5 or off the hard disk 6 and is copied and output with the image on the document page being recognized.

In this second case, it is necessary to judge the image data showing the type of image on the document page, (e.g., monochromatic character, halftone, or color). However, this judgement could be only performed after recognizing the image on the whole document page. At the same time, if the image data is stored in the image data format as shown in FIG. 5(B), the data is judged whether the monochromatic character image or color image by the color flag, therefore, the recognized image is directly outputted in accordance with the judgement described above without re-scanning. As a result, when the type of the image on the document is monochromatic character, it is unnecessary to carry on the color process so as to perform the high speed recording. On the other hand, after reading the image, when the type of image is recognized to the halftone the image data is re-read by re-scanning to store the image data format in accordance with the halftone.

According to the operations as described above, no color processing or halftone processing is performed on monochromatic character document pages. Therefore, the copying and production of these documents can be done at high speed.

While a specific embodiment of the present invention has been made. It should be understood that the present invention is not limited to the embodiment as mentioned above, but may variously be changed and modified within the scope of the appended claims. The control device may execute various types of edits, such as mask processing to remove a preset area in an image on a document, and trimming processing to pick up only a preset area in the image. In the above-mentioned embodiment, the data transfer to and from the page memory is directed by the control device. If required, a direct memory access controller may be used for this purpose.

in the embodiment as mentioned above, the image record section is designed such that one color developing unit is allowed to be mounted in addition to the black developing unit. If required, the image record section may be modified such that color developing units of two or more can be mounted. In this case, the color check circuit would be modified so as to discriminately check the multiple colors. The number of bits of the color flag would therefore be increased.

As seen from the foregoing description, the image processing system according to the present invention recognizes the images on a set of document pages constituting a job or batch, and determines the required format of the image data on the basis of this recognition. These abilities provide several advantages. The resources of the image processing system can efficiently be utilized. The copying of original documents and production of document copies can be performed at high speed. Furthermore, the amount of the image data that must be generated to produce copies should be kept to a minimum. Accordingly, the number of documents that can be stored in page memory or on a hard disk is increased. This increased storage ability is even more remarkable when a serial pack storage system is used for the page memory.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image processing system comprising:
   image means for reading an original image and sequentially generating image data corresponding to the original image, and for discriminately recognizing a plurality of original image types and generating recognition signals associated with said image data and indicating an image type for said associated image data, said image type corresponding to one of said plurality of original image types, and said one of said plurality of original image types corresponding to the original image;
   image processing means for determining a data structure for the image data according to the recognition signals, and for storing and retrieving the image data according to the sequence in which the image data was generated, wherein said image processing means includes a page memory for storing image data received from the image reading means in the data structure determined for the image data; and,
   image recording means for receiving said retrieved image data and for producing a copy of the image data having the image type indicated by said recognition signals associated with said copied image data and corresponding to one of the plurality of original image types;
   wherein said image reading means includes a scanner for reading an original image by moving from a starting position to an ending position at a predetermined speed;

wherein a prescan of each subsequent original image is performed during a time period during which said scanner returns to the starting position after a previous original image is read;

wherein said image reading means includes means for performing a prescan of the original image to recognize an image type of the original image and for generating corresponding recognition signals.

2. An image processing system comprising:

image means for reading an original image and sequentially generating image data corresponding to the original image, and for discriminately recognizing a plurality of original image types and generating recognition signals associated with said image data and indicating an image type for said associated image data, said image type corresponding to one of said plurality of original image types, and said one of said plurality of original image types corresponding to the original image;

image processing means for determining a data structure for the image data according to the recognition signals, and for storing and retrieving the image data according to the sequence in which the image data was generated, wherein said image processing means includes a page memory for storing image data received from the image reading means in the data structure determined for the image data; and image recording means for receiving said retrieved image data and for producing a copy of the image data having the image type indicated by said recognition signals associated with said copied image data and corresponding to one of the plurality of original image types;

wherein said image reading means includes means for recognizing an image type of the original image before the corresponding copy image is produced by said image recording means;

wherein said means for recognizing includes means for performing a prescan of the original image to recognize an image type of the original image and for generating corresponding recognition signals;

wherein said image reading means comprises a scanner for reading an original image by moving from a starting position to an ending position at a predetermined speed;

wherein a prescan of each subsequent original image is performed during a time period during which said scanner returns to the starting position after a previous original image is read.

3. The image processing system of claim 1 or 2, wherein the prescan is preformed at a speed higher than the predetermined speed.

4. An image processing system comprising:

image reading means for sequentially reading an original image on each one of one or more document pages, including, means for discriminately recognizing a plurality of image types, means for sequentially generating image data corresponding to the original image, the means for generating one of a plurality of recognition signals, each recognition signal indicating one of the plurality of image types;

image processing means for storing the image data including, control means responsive to the one of the plurality of recognition signals for generating a data format signal, means responsive to the data format signal for selecting one of a plurality of data structures, the selected data structure corresponding to the recognized image type of the original image, page memory for storing image data received from the image reading means in the selected data structure, memory for storing image data corresponding to a plurality of document pages received from the page memory; and image recording means for retrieving image data from the page memory and for producing a copy of the image data having the image type corresponding to the data format signal;

wherein the means for discriminately recognizing includes means for prescanning the original image on each document page before the image reading means reads the original image;

wherein the means for prescanning operates on second and subsequent document pages during a time period required for the scanner to return to a starting point upon reading a previous document page.

* * * * *

UNITED STATES PATENT AND TRADEMARK OFFICE
CERTIFICATE OF CORRECTION

PATENT NO. : 5,420,694
DATED : May 30, 1995
INVENTOR(S) : Fuminari MATSUMOTO

It is certified that error appears in the above-indentified patent and that said Letters Patent is hereby corrected as shown below:

Claim 4, column 10, line 15, "the" (second occurrence) should read --and--.

Signed and Sealed this

Twenty-eighth Day of May, 1996

Attest:

BRUCE LEHMAN

Attesting Officer    Commissioner of Patents and Trademarks